April 1, 1924.　　　　　　　　　　　　　　　　　　　1,489,094
M. J. MILZ
SHAFT BEARING HANGER
Filed March 25, 1922　　　2 Sheets-Sheet 2
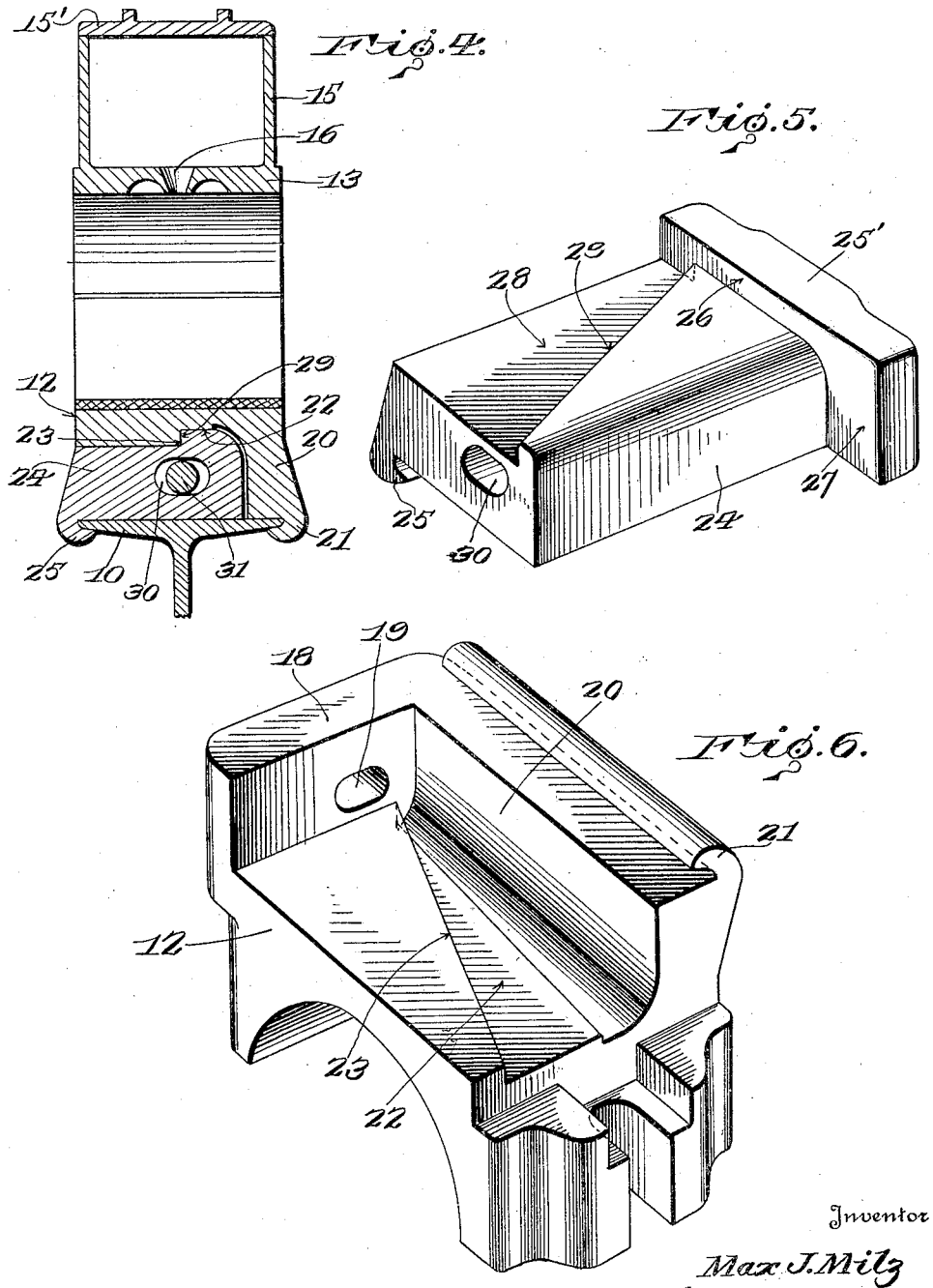

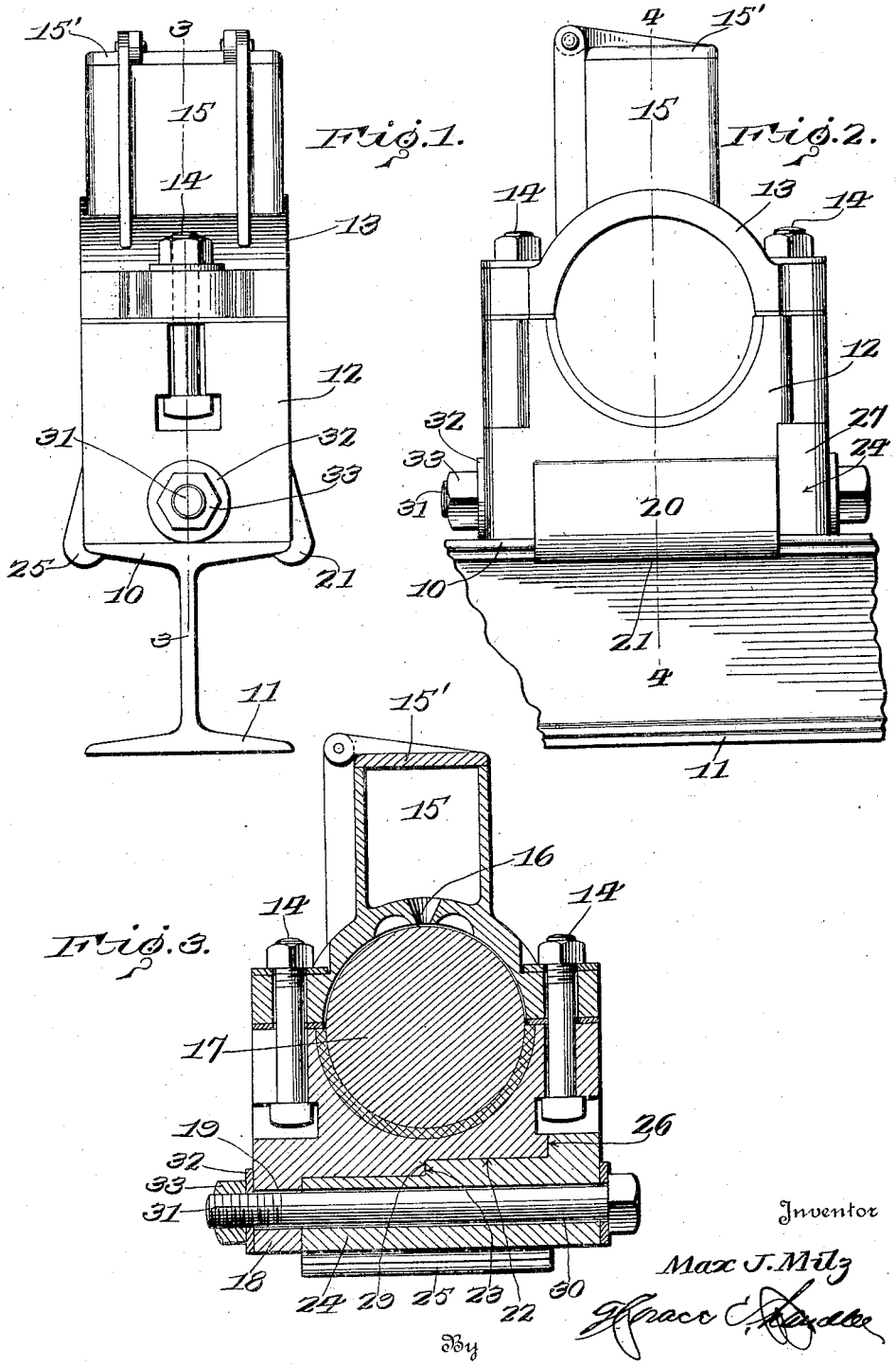

Patented Apr. 1, 1924.

1,489,094

UNITED STATES PATENT OFFICE.

MAX J. MILZ, OF TAFT, CALIFORNIA, ASSIGNOR TO MIDWAY IRON WORKS, INCORPORATED, A CORPORATION OF CALIFORNIA.

SHAFT-BEARING HANGER.

Application filed March 25, 1922. Serial No. 546,688.

*To all whom it may concern:*

Be it known that I, MAX J. MILZ, a citizen of the United States, residing at Taft, in the county of Kern, State of California, have invented certain new and useful Improvements in Shaft-Bearing Hangers; and I do hereby declare the following to be a full, clear, and exact description of the invention, such as will enable others skilled in the art to which it appertains to make and use the same.

This invention relates to new and useful improvements in shaft bearings, and particularly to hangers therefor.

One object of the invention is to provide a novel and improved form of clamp, forming a part of the shaft bearing, by means of which the bearing may be easily and firmly attached to the flange of a beam, such as an I-beam.

Another object is to provide a clamp of this character, associated with a shaft bearing, in which a single bolt is employed to effect the firm and positive engagement with the flanges of the beam, and whereby the bearing may be readily adjusted to any desired position along the beam.

Other objects and advantages will be apparent from the following description when taken in connection with the accompanying drawing.

In the drawing:

Figure 1 is an elevation of the shaft bearing, the beam being shown in section.

Figure 2 is an elevation, viewed from a position in a plane at right angles to that of Figure 1, and showing the shaft in section.

Figure 3 is a vertical longitudinal central sectional view on the line 3—3 of Figure 1.

Figure 4 is a vertical longitudinal central sectional view on the line 4—4 of Figure 2.

Figure 5 is a perspective view of the lower removable section of the clamp.

Figure 6 is an inverted perspective view of the upper or bearing carried portion of the clamp.

Referring particularly to the accompanying drawings, there is shown an I-beam, which has the upper and lower flanges 10 and 11, and it is in connection with the lower flange 11, or the upper flange 10, that the bearing is adapted to be attached.

The bearing includes a lower section 12, and an upper section 13, which are removably secured together by means of the vertical bolts 14. On the upper end of the upper section there is formed a lubricant containing box 15, having an opening 16, in its bottom, for feeding lubricant to the shaft 17, disposed within the bearing.

The lower section of the bearing has formed, at one end, a depending transverse flange 18, in which is formed an elongated opening 19, the purpose of which will presently appear herein. A depending flange 20, is formed on one side of the bearing, and meets the flange 18, at one corner of the section 12. On the lower edge of the flange 20 there is formed a longitudinally extending and inwardly directed lip 21, which, as clearly seen in the sectional view, Figure 3, embraces one edge of the flange 10 of the I-beam. The bottom face of the section 12 is reduced in thickness, throughout its length, from a point adjacent the flange 18, to a point adjacent the diagonally opposite corner of said lower face, which produces the recess 22, and the obliquely extending shoulder 23.

The removable portion of the lower section of the bearing consists of a block 24 having a depending longitudinally extending lip 25, similar to the lip 21, and arranged to embrace the other edge of the beam flange. On one end of the block 24 there is formed a member 25, which extends beyond the upper face of the block, at 26, and beyond one side face thereof, at 27. The portion 26 abuts against the unflanged end of the lower portion of the lower section 12, while the portion 27 abuts against the adjacent end of the flange 20, the flange 18 extending across the other end of the block 24, while the flange 20 rests on the beam against the unlipped side of the block, and against the portion 27. The upper face of the block is cut similarly to the lower face of the section 12, to form the recess 28, and the oblique shoulder 29. The recess 28 receives the shoulder 23, while the recess 22 receives the shoulder 29. The oblique shoulders thus ride against each other and permit the relative longitudinal movement thereof on the beam, with the result that the lips of the members 12 and 24 will be moved into and out of gripping engagement with the flanges of the beam.

Formed longitudinally through the block 24 is an opening 30, the same registering with the opening 19, of the flange 18, to receive therethrough, the bolt 31. The other end of the bolt projects beyond the member 25, and receives thereon the washer 32 and the nut 33. Thus, when the parts are properly assembled, and the nut is screwed home, against the washer, the section 12 and the block 24 will be moved relatively to each other, longitudinally of the beam, and firmly embrace the flanges of the beam with their lips. To adjust the bearing longitudinally on the beam, the nut 33 is loosened, thus permitting the bearing to be slipped along the beam, to the position desired, after which the nut is tightened, to hold the bearing in its adjusted position.

The lubricant box 15 is provided with a hinged cover 15′, on its upper side, to exclude dirt and dust.

What is claimed is:

1. A shaft bearing including a body having a recess in its lower face which is open at one side and at one end, a beam flange engaging lip formed on the closed side of the recess, a longitudinal and obliquely extending shoulder on the upper wall of the recess, shaft engaging means on the upper side of the body, a removable section having a longitudinal and obliquely extending shoulder on its upper face for slidable engagement with the first shoulder and a beam flange engaging lip on one side of the section, the removable section having an opening formed longitudinally therethrough, the end wall of the body having an opening, and a clamping means engaged through said openings for moving the body and section longitudinally and transversely of each other to engage and disengage the lips with respect to the flange of a beam.

2. A shaft bearing including a body having shaft engaging means on its upper portion, a recess in the lower having a longitudinal oblique shoulder, the end wall of the recess having an elongated opening, a removable section having an oblique shoulder for cooperative engagement with the first shoulder, the body and section having cooperating beam flange engaging lips, the section having a longitudinally extending and transversely elongated opening therethrough aligned with the first opening, and a clamping bolt disposed through said openings for moving the body and section longitudinally with respect to each other and transversely with respect to a beam.

3. A shaft bearing including a body having depending angularly meeting flanges on its lower face, a beam engaging lip on one of the flanges and extending longitudinally thereof, a longitudinal and oblique shoulder on the lower face of the body and spaced from the lip carrying flange, a removable section having a lip on one edge forming a complement to the first-named lip and a longitudinal and oblique shoulder opposite to the lip and spaced therefrom for cooperation with the first shoulder, the other flange and the removable section having alined openings, and a clamping bolt disposed said openings.

In testimony whereof, I affix my signature, in the presence of two witnesses.

MAX J. MILZ.

Witnesses:
WILLIAM BORSHARD,
J. W. DANIELL.